US010432846B2

(12) United States Patent
Yang

(10) Patent No.: US 10,432,846 B2
(45) Date of Patent: Oct. 1, 2019

(54) ELECTRONIC DEVICE, IMAGE CAPTURING METHOD AND STORAGE MEDIUM

(71) Applicant: Chiun Mai Communication Systems, Inc., New Taipei (TW)

(72) Inventor: Tsung-Shan Yang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/075,641

(22) Filed: Mar. 21, 2016

(65) Prior Publication Data
US 2017/0180632 A1  Jun. 22, 2017

(30) Foreign Application Priority Data
Dec. 22, 2015  (CN) .......................... 2015 1 0969441

(51) Int. Cl.
*H04N 5/232*  (2006.01)
*H04N 9/73*  (2006.01)

(52) U.S. Cl.
CPC ..... *H04N 5/23216* (2013.01); *H04N 5/23222* (2013.01); *H04N 5/23293* (2013.01); *H04N 5/23296* (2013.01); *H04N 9/735* (2013.01)

(58) Field of Classification Search
CPC .............. H04N 5/23216; H04N 9/735; H04N 5/23296; H04N 5/23293
See application file for complete search history.

(56) References Cited

U.S. PATENT DOCUMENTS

| | | | | |
|---|---|---|---|---|
| 6,697,105 | B1* | 2/2004 | Kato | H04N 5/23203 348/211.11 |
| 2003/0103234 | A1* | 6/2003 | Takabayashi | H04N 1/00132 358/1.15 |
| 2004/0201756 | A1* | 10/2004 | VanBree | H04N 5/222 348/239 |
| 2009/0214082 | A1* | 8/2009 | Hoshi | H04N 1/00132 382/106 |
| 2011/0292221 | A1* | 12/2011 | Gu | H04N 5/23222 348/207.1 |
| 2012/0099012 | A1* | 4/2012 | Ryu | H04N 5/23293 348/333.01 |

(Continued)

FOREIGN PATENT DOCUMENTS

CN  102279694 A  12/2011
CN  103731599 A  4/2014
(Continued)

*Primary Examiner* — Mekonnen D Dagnew
(74) *Attorney, Agent, or Firm* — ScienBiziP, P.C.

(57) ABSTRACT

A method for capturing an image includes obtaining location coordinates of an electronic device when a camera device enters a preview mode. Images are obtained according to the obtained location coordinates. The obtained images are displayed on a display device. One of the obtained images is set to be a reference image. Orientation parameters of the reference image and orientation parameters of the electronic device are obtained. One or more difference values are calculated using the obtained orientation parameters. The one or more difference values are displayed on the display device according to one or more indicating icons. Once an adjustment to the orientation of the electronic device is ended, the camera device is controlled to capture an image.

15 Claims, 8 Drawing Sheets

(56) References Cited

U.S. PATENT DOCUMENTS

2015/0002688 A1* 1/2015 Baldwin ............ H04N 5/23203
348/211.9

FOREIGN PATENT DOCUMENTS

| CN | 104301613 A | 1/2015 |
| CN | 104869308 A | 8/2015 |
| TW | 201015984 A1 | 4/2010 |
| TW | 201040882 A1 | 11/2010 |
| TW | 201338518 A | 9/2013 |

* cited by examiner

ELECTRONIC DEVICE, IMAGE CAPTURING METHOD AND STORAGE MEDIUM

CROSS-REFERENCE TO RELATED APPLICATIONS

This application claims priority to Chinese Patent Application No. 201510969441.7 filed on Dec. 22, 2015, the contents of which are incorporated by reference herein. Additionally, the content of this application is related to a patent application Ser. No. 15/075,476.

FIELD

The subject matter herein generally relates to image capturing technology, and particularly to an electronic device and a method for capturing an image using the electronic device.

BACKGROUND

Electronic devices are used to process and capture information. Many electronic devices can combine multiple features. For example, the electronic device can be a mobile phone that is configured with a camera device can be used to capture images.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
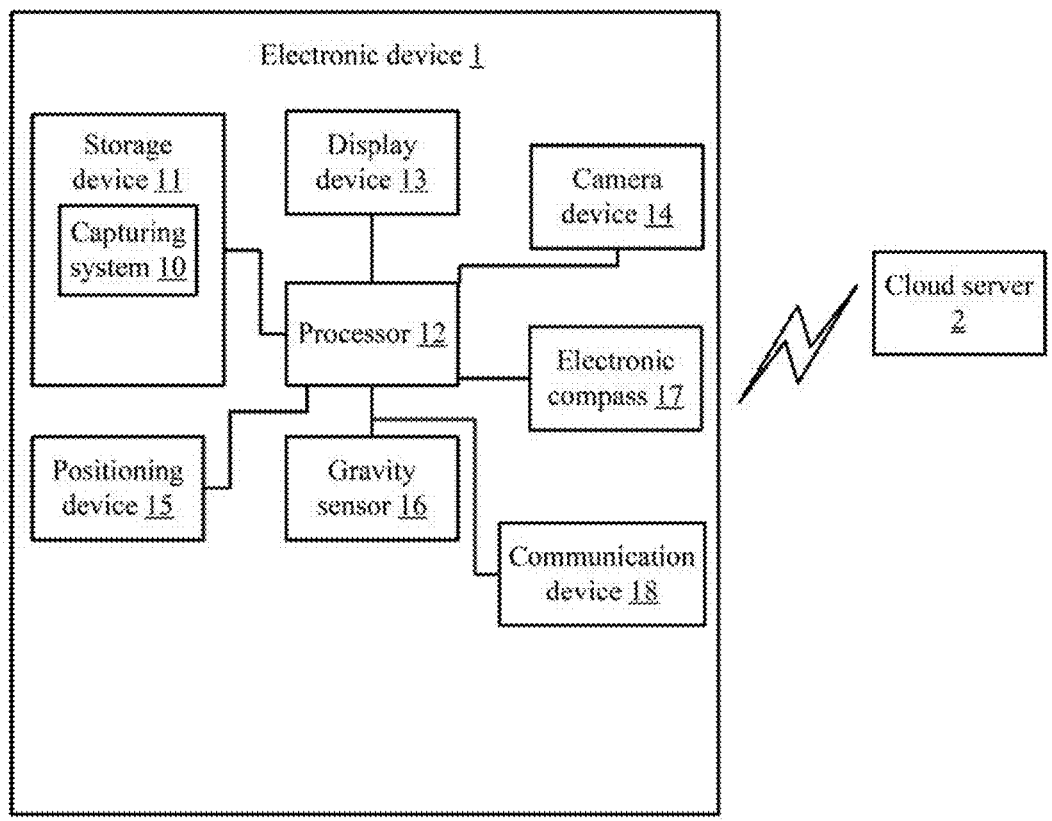
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device. Depending on the embodiment, an electronic device 1 may include, but is not limited to, a capturing system 10, a storage device 11, at least one processor 12, a display device 13, a camera device 14, a positioning device 15, a gravity sensor 16, an electronic compass 17, and a communication device 18. The above components are electrically connected to each other. The electronic device 1 can be a smart phone, a personal digital assistant (PDA), a computer, or any other suitable electronic device. FIG. 1 illustrates only one example of the electronic device 1 that can include more or fewer components than illustrated, or have a different configuration of the various components in other embodiments.

The electronic device 1 can establish communication connection with a cloud server 2 using the communication device 18. The communication device 18 is configured with a wired or wireless communication function such as WiFi, 3G 4G. In at least one embodiment, the cloud server 2 pre-stores a plurality of images, and related parameters of each of the plurality of images. In at least one embodiment, the related parameters can include, but are not limited to, setting parameters, orientation parameters, editing parameters, and other parameters.

Figure 2:
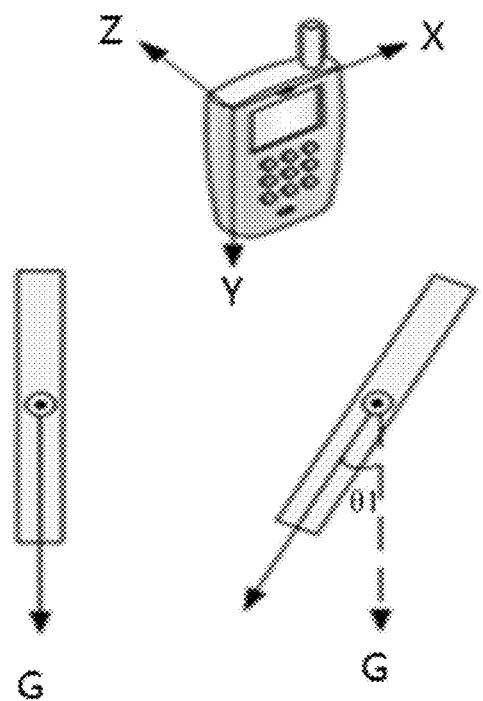
FIG. 2 illustrates an example of a pitching angle and a horizontal azimuth angle of the electronic device.
Figure 2:
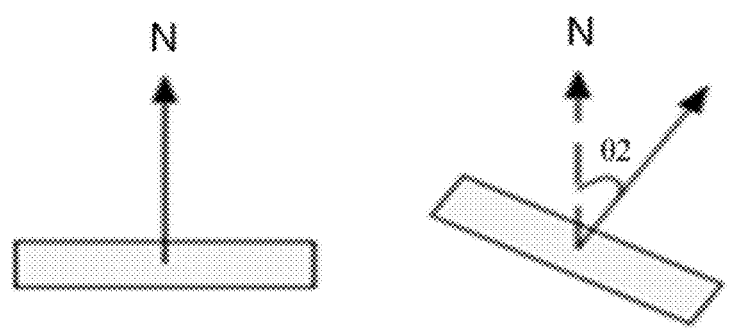

In at least one embodiment, the setting parameters can include, but are not limited to, a color temperature, an exposure value, an ISO value, an aperture value, a shutter speed value, and a white balance of an image capturing device when the image capturing device captures the image. The image capturing device is defined to be an electronic device that is used to capture the image. The orientation parameters can include, but are not limited to, location coordinates, a pitching angle (e.g., θ1 as shown in FIG. 2), and a horizontal azimuth angle (e.g., θ2 as shown in FIG. 2) of the image capturing device when the image capturing device captures the image. The editing parameters is defined to be parameters that is edited by the image capturing device.

For example, the editing parameters can include, but are not limited to, a brightness value, a contrast value, a saturation value, a sharpness value, and the white balance of the image. The other parameters can include, but are not limited to, capturing time and weather when the image capturing device captures the image, and a brand and a mode of the image capturing device.

In at least one embodiment, the capturing system 10 can adjust the camera device 14 according to the related parameters of each of the plurality of images stored in the cloud server 2. The capturing system 10 can further capture an image when the camera device 14 is adjusted. Details will be provided in the follow paragraphs.

In at least one embodiment, the capturing system 10 can obtain the related parameters of each of the plurality of images by searching the cloud server 2.

In other embodiments, the cloud server 2 can protect the related parameters of each of the plurality of images from being accessed. For example, the cloud server 2 does not allow an electronic device such as the electronic device 1 to obtain the related parameters of each of the plurality of images. The cloud server 2 can allow the electronic device 1 to obtain the related parameters of one of the plurality of images, until related fee for obtaining the related parameters of the one of the plurality of images has received from the electronic device 1.

In at least one embodiment, the related fee can be set according to a preset rule by the cloud server 2. For example, the cloud server 2 can set the related fee for obtaining the related parameters of each of the plurality of images is equal to dollar predetermined fee, for example one dollar.

The storage device 11 can be an internal storage device, such as a flash memory, a random access memory (RAM) for temporary storage of information, and/or a read-only memory (ROM) for permanent storage of information. The storage device 11 can also be an external storage device, such as a smart media card, a secure digital card, and/or a flash card.

The at least one processor 12 can be a central processing unit (CPU), a microprocessor, or other data processor chip that performs functions of the electronic device 1.

The display device 13 can provide an interface for interaction between a user and the electronic device 1. The display device 13 can be a touch screen that can be used to display various kinds of information of the electronic device 1.

The positioning device 15 can be used to detect location coordinates of the electronic device 1.

In at least one embodiment, the positioning device 15 can be a Global Positioning System (GPS), an Assisted Global Positioning System (AGPS), a BeiDou Navigation Satellite System (BDS), or a Global Navigation Satellite System (GLONASS).

The gravity sensor 16 can be used to detect a pitching angle of the electronic device 1.

The electronic compass 17 can be used to detect a horizontal azimuth angle of the electronic device 1.

Figure 3:
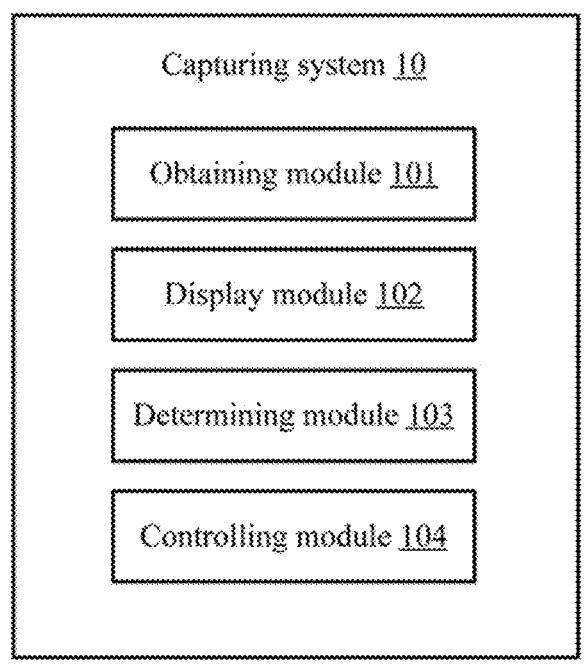
FIG. 3 is a block diagram of one embodiment of modules of a capturing system installed in the electronic device of FIG. 1.

In at least one embodiment, as illustrated in FIG. 3, the capturing system 10 can be installed in the electronic device 1. The capturing system 10 can include an obtaining module 101, a display module 102, a determining module 103, and a controlling module 104. The modules 101-104 can include computerized codes in form of one or more programs, which are stored in the storage device 11, and are executed by the at least one processor 12. Details will be provided in conjunction with a flow chart of FIG. 4 and FIG. 5 in the following paragraphs.

Figure 4:
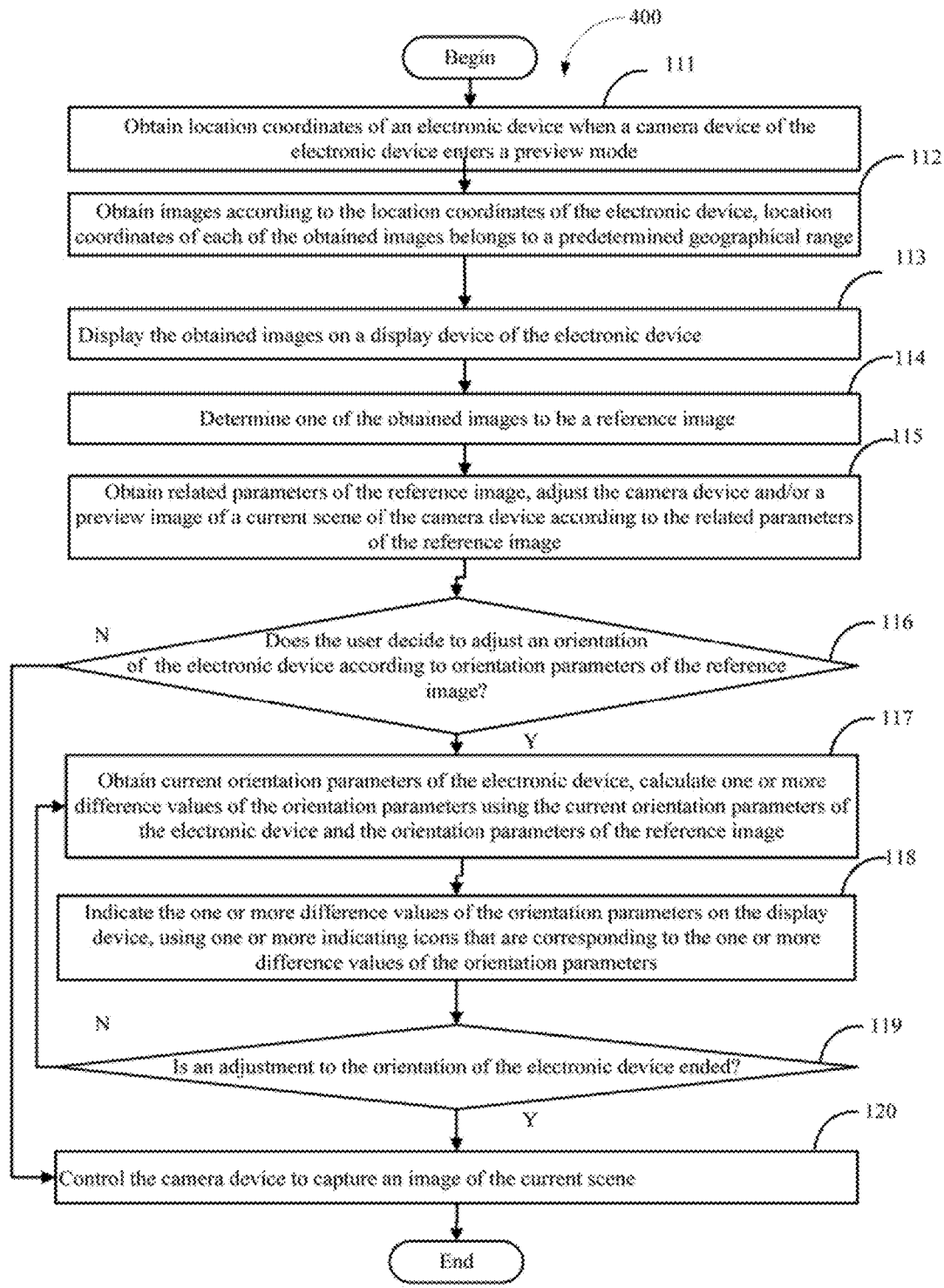
FIG. 4 illustrates a flow chart of one embodiment of a method for capturing an image.
Figure 5:
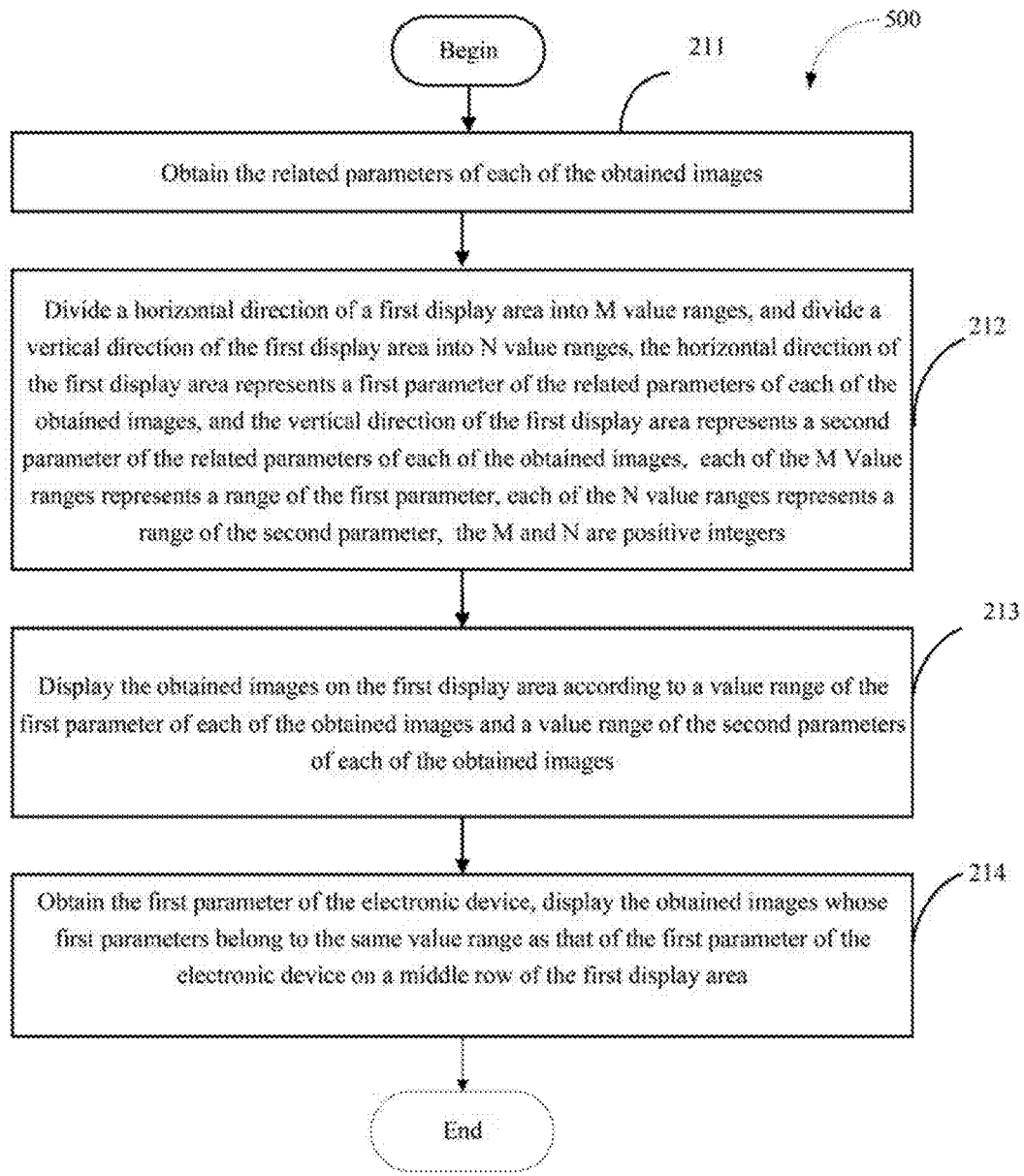
FIG. 5 illustrates a flow chart of one embodiment of a method for displaying images.

FIG. 4 illustrates a flowchart of one embodiment of capturing an image using the electronic device 1. The example method 400 is provided by way of example, as there are a variety of ways to carry out the method. The method 400 described below can be carried out using the configurations illustrated in FIG. 1, for example, and various elements of these figures are referenced in explaining example method 400. Each block shown in FIG. 4 represents one or more processes, methods or subroutines, carried out in the exemplary method 400. Additionally, the illustrated order of blocks is by example only and the order of the blocks can be changed according to the present disclosure. The exemplary method 400 can begin at block 111. Depending on the embodiment, additional steps can be added, others removed, and the ordering of the steps can be changed.

At block 111, when the camera device 14 enters a preview mode, the obtaining module 101 can obtain location coordinates of the electronic device 1.

Figure 6A:
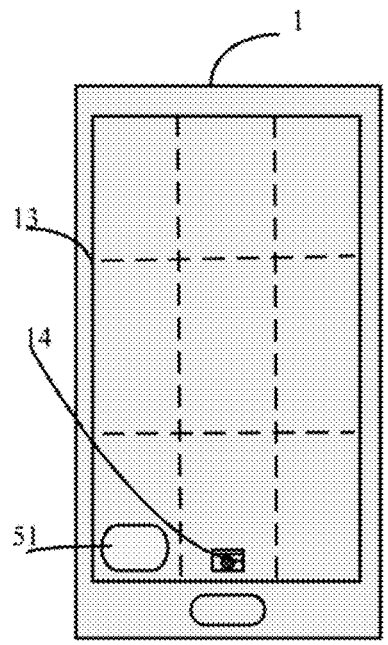
FIG. 6A-6E illustrates an example of displaying images on a display device of the electronic device.

For example, as shown in FIG. 6A, in at least one embodiment, when the camera device 14 enters the preview mode, the display module 102 can display a first button 51 on the display device 13. When the first button 51 is touched, the obtaining module 101 can invoke the positioning device 15 to obtain the location coordinates of the electronic device 1.

In other embodiments, when the camera device 14 enters the preview mode, the obtaining module 101 can automatically invoke the positioning device 15 to obtain the location coordinates of the electronic device 1.

At block 112, the obtaining module 101 can obtain images according to the location coordinates of the electronic device 1.

In at least one embodiment, location coordinates of each of the obtained images belongs to a predetermined geographical range.

In at least one embodiment, the predetermined geographical range can be a circular range that is formed by a centre and a predetermined radius, wherein the centre is defined to be the location coordinates of the electronic device 1, and the predetermined radius is equal to a predetermined distance (e.g., 5 kilometers) from the centre.

In at least one embodiment, the obtained images are obtained from the cloud server 2. In at least one embodiment, capturing time of each of the obtained images is within a predetermined time period (e.g., the past year).

At block 113, the display module 102 can display the obtained images on the display device 13.

Figure 6B:
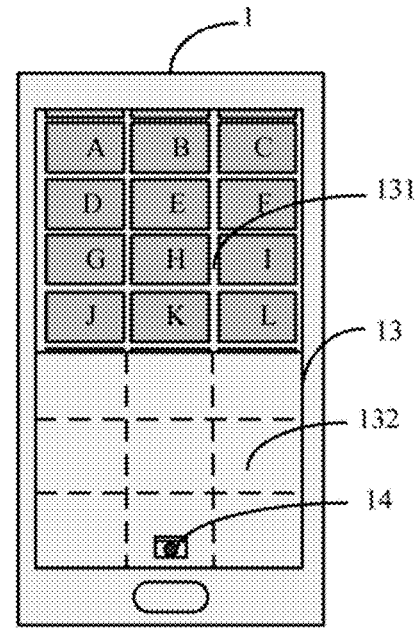

In at least one embodiment, as shown in FIG. 6B, the display module 102 can divide a display area of the display device 13 into a first display area 131 and a second display area 132 as shown in FIG. 6B. The display module 102 can display the obtained images on the first display area 131. For example, the display module 102 can display the obtained images "A", "B", "C" . . . "L" in the first display area 131. The display module 102 can display a preview image of a current scene of the camera device 14 on the second display area 132.

In at least one embodiment, the display module 102 can display the obtained images randomly on the first display area 131. In other words, a position of each of the obtained images on the first display area 131 is randomly assigned by the display module 102.

In other embodiments, the display module 101 can display the obtained images on the first display area 131 according to the related parameters of each of the obtained images. Details will be provided in conjunction with a flow chart of FIG. 5 in the following paragraphs.

At block 114, the determining module 103 can determine one of the obtained images to be a reference image. In at least one embodiment, the determining module 103 can determine the reference image according to touch signals generated on the one of the obtained images.

In at least one embodiment, if only one image is obtained at block 112, the determining module 103 can automatically determine the only one image to be the reference image.

In at least one embodiment, if more than one images are obtained at block 112, the determining module 103 can automatically determine the reference image according to preset user preferences. For example, the determining module 103 can determine one of the obtained images whose subject matter is a landscape to be the reference image, if the user presets the landscape image as the preference.

In at least one embodiment, when the reference image is determined, the display module 102 can only display the reference image on the first display area 131. In other words, the obtained images except the reference image are not displayed on the first display area 131.

Figure 6C:
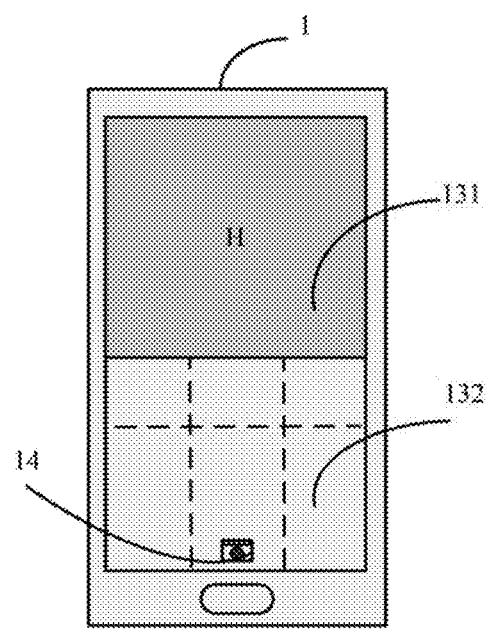

For example, as shown in FIG. 6C, when the image "H" is determined to be the reference image, the display module 102 can only display the image "H" on the first display area 131.

At block 115, the obtaining module 101 can obtain the related parameters of the reference image. In at least one embodiment, the related parameters can include, but are not limited to, the setting parameters, the orientation parameters, the editing parameters, and the other parameters of the reference image.

The obtaining module 101 can further adjust the camera device 14 according to the obtained setting parameters. The display module 102 can display the preview image of the current scene of the camera device 14 on the second display area 132 after the camera device 14 is adjusted by the obtaining module 101.

In at least one embodiment, when the camera device 14 has been adjusted according to the obtained setting parameters, the obtaining module 101 can further adjust the preview image according to the obtained editing parameters.

As mentioned above, the setting parameters can include, but are not limited to, the color temperature, the exposure value, the ISO value, the aperture value, the shutter speed value, and the white balance of the image capturing device when the image capturing device captures the image. The editing parameters can include, but are not limited to, the brightness value, the contrast value, the saturation value, the sharpness value, and the white balance of the image.

In at least one embodiment, if the cloud server 2 does not protect the related parameters of each of the plurality of images from being accessed, the obtaining module 101 can obtain the reference image together with the related parameters of the reference image at block 112. In other embodiments, if the cloud server 2 does not protect the related parameters of each of the plurality of images from being accessed, the obtaining module 101 can send a request for obtaining the related parameters of the reference image to the cloud server 2. The cloud server 2 can send the related parameters of the reference image to the electronic device 1 in response to the request. That is, the obtaining module 101 can obtain the related parameters of the reference image from the cloud server 2.

In other embodiments, if the cloud server 2 protects the related parameters of each of the plurality of images from being accessed, the obtaining module 101 can send the request for obtaining the related parameters of the reference image to the cloud server 2. The cloud server 2 can send a payment notice to the electronic device 1 in response to the request, to request the user to pay for related fee of the related parameters of the reference image. When the obtaining module 101 receives the payment notice, the obtaining module 101 can pay for the related fee in response to user's operation. The cloud server 2 can send the related parameters of the reference image to the electronic device 1. Then the obtaining module 101 can receive the related parameters of the reference image from the cloud sever 2.

Figure 6D:
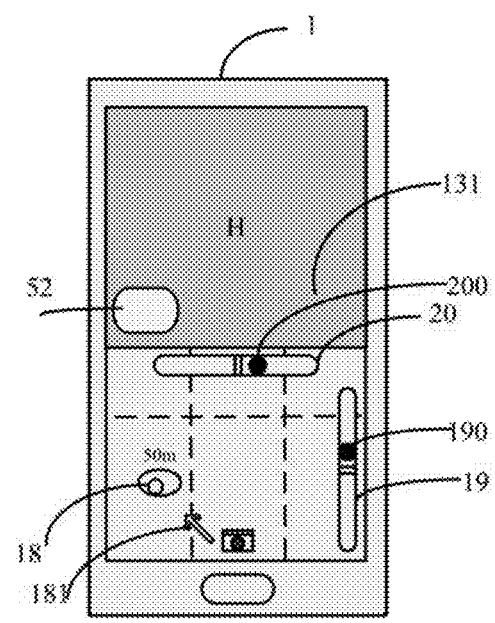

In at least one embodiment, as shown in FIG. 6D, the obtaining module 101 can display a second button 52 on the first display area 131. When the second button 52 is touched by the user, the obtaining module 101 can send the request to the cloud server 2, to obtain the related parameters of the reference image from the cloud sever 2.

In other embodiments, the step of obtaining the setting parameters of the reference image and the step of adjusting the camera device 14 according to the setting parameters of the reference image can be removed. Also the step of obtaining the editing parameters of the reference image and the step of adjusting the preview image according to the editing parameters of the reference image can be removed too.

In at least one embodiment, when the block 115 is processed, the process can directly go to block 120, so that blocks 116-119 are skipped. In other embodiments, in order to meet further requirements of the user, blocks 116-119 can be implemented. For example, the user may want to capture an image whose scene and/or orientation is the same to the reference image. In this example, the blocks 116-119 can be implemented.

At block 116, the determining module 103 can determine whether the user decide to adjust an orientation of the electronic device 1 according to the orientation parameters of the reference image.

When the user decides to adjust the orientation of the electronic device 1 according to the orientation parameters of the reference image, the process goes to block 117. When the user decides not to adjust the orientation of the electronic device 1 according to the orientation parameters of the reference image, the process goes to block 120.

As mentioned above, the orientation parameters can include, but are not limited to, the location coordinates, the pitching angle, and the horizontal azimuth angle of the image capturing device when the image capturing device captures the reference image.

In at least one embodiment, the determining module 103 can display a dialog box to ask the user whether the orientation of the electronic device 1 needs to be adjusted according to the orientation parameters of the reference image. Therefore, the determining module 103 can determine whether the user decide to adjust the orientation of the electronic device 1 or not according to user's selection from the dialog box.

At block 117, the obtaining module 101 can obtain current orientation parameters of the electronic device 1. The determining module 103 can calculate one or more difference values of the orientation parameters using the current orientation parameters of the electronic device 1 and the orientation parameters of the reference image.

For example, the orientation parameters of the reference image includes the location coordinates, the pitching angle, and the horizontal azimuth angle of the image capturing device when the image capturing device captures the reference image. The obtaining module 101 can obtain a current location coordinates of the electronic device 1 using the positioning device 15. The obtaining module 101 can obtain a current pitching angle of the electronic device 1 using the gravity sensor 16.

The obtaining module 101 can further obtain a current horizontal azimuth angle of the electronic device 1 using the electronic compass 17. Then, the determining module 103 can calculate a difference value of the location coordinates using the current location coordinates of the electronic device 1 and the location coordinates of the image capturing device when the image capturing device captures the reference image.

The determining module 103 can calculate a difference value of the pitching angle using the current pitching angle of the electronic device 1 and the pitching angle of the image capturing device when the image capturing device captures the reference image. The determining module 103 can further calculate a difference value of the horizontal azimuth angle using the current horizontal azimuth angle of the electronic device 1 and the horizontal azimuth angle of the image capturing device when the image capturing device captures the reference image.

In at least one embodiment, the determining module 103 can further calculate a distance value using the current location coordinates of the electronic device 1 and the location coordinates of the image capturing device when the image capturing device captures the reference image. The determining module 103 can determine the distance value to be the difference value of the location coordinates.

At block 118, the display module 102 can indicate the one or more difference values of the orientation parameters on the display device 13, using one or more indicating icons that are corresponding to the one or more difference values of the orientation parameters. That is, the user can adjust the orientation of the electronic device 1 under the help of the one or more indicating icons.

For example, as shown in FIG. 6D, the display module 102 can display three indicating icons on the display device 13. The three indicating icons include a first indicating icon 18 that is used to indicate the difference value of the location coordinates (e.g., 50 meters), a second indicating icon 19 that is used to indicate the difference value of the pitching angle, and a third indicating icon 20 that is used to indicate the difference value of the horizontal azimuth angle.

In other embodiments, the display module 102 can further display a fourth indicating icon 181 on the display device 13. The fourth indicating icon 181 is used to point to the location coordinates of the image capturing device when the image capturing device captures the reference image. That is, the user can walk forward to the location coordinates of the image capturing device under the help of the fourth indicating icon 181.

In at least one embodiment, as shown in FIG. 6D, the second indicating icon 19 includes a first indicating ball 190. When the first indicating ball 190 is located at a middle position of the indicating icon 19, the difference value of the pitching angle is equal to 0. In other words, the current pitching angle of the electronic device 1 is the same to the pitching angle of the image capturing device when the image capturing device captures the reference image. When the first indicating ball 190 is located at an upper position of the indicating icon 19, the current pitching angle of the electronic device 1 is greater than the pitching angle of the image capturing device when the image capturing device captures the reference image. In contrast, when the first indicating ball 190 is located at a lower position of the indicating icon 19, the current pitching angle of the electronic device 1 is less than the pitching angle of the image capturing device when the image capturing device captures the reference image.

In at least one embodiment, the third indicating icon 20 can include a second indicating ball 200. When the second indicating ball 200 is located at a middle position of the third indicating icon 20, the difference value of the horizontal azimuth angle is equal to 0. In other words, the current horizontal azimuth angle of the electronic device 1 is the same to the horizontal azimuth angle of the image capturing device when the image capturing device captures the reference image. When the second indicating ball 200 is located at a right position of the third indicating icon 20, the current horizontal azimuth angle of the electronic device 1 is greater than the horizontal azimuth angle of the image capturing device when the image capturing device captures the reference image. In contrast, when the second indicating ball 200 is located at a left position of the third indicating icon 20, the current horizontal azimuth angle of the electronic device 1 is less than the horizontal azimuth angle of the image capturing device when the image capturing device captures the reference image.

At block 119, the determining module 103 can determine whether an adjustment to the orientation of the electronic device 1 needs to be ended. When the adjustment to the orientation of the electronic device 1 has ended, the method goes to block 120. When the orientation of the electronic device 1 has not ended, the method goes back to block 117.

Figure 6E:
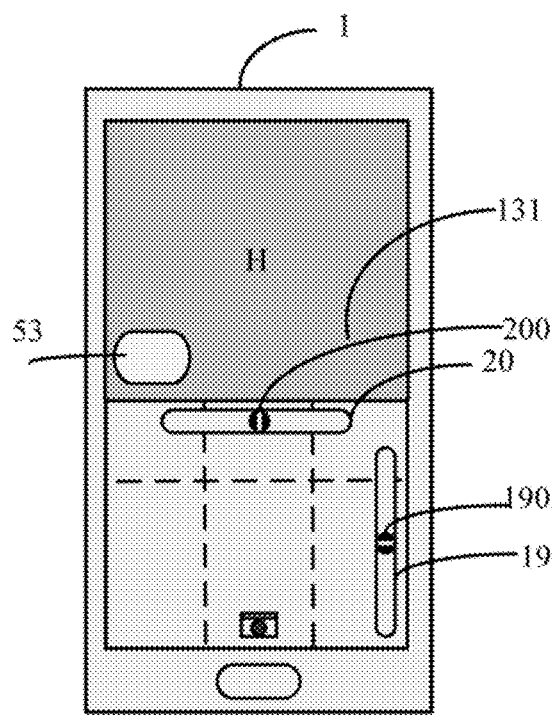

In at least one embodiment, as shown in FIG. 6E, the determining module 103 can display a third button 53 on the display device 13, when the third button 53 is touched, the determining module 103 can determine the adjustment to the orientation of the electronic device 1 can be ended. In other embodiments, the determining module 103 can determine the adjustment to the orientation of the electronic device 1 needs to be ended when each of the one or more difference value of the orientation parameters is less than a corresponding preset value. For example, when the difference value of the location coordinates is less than a first preset value, the difference value of the pitching angle is less than a second preset value, and the difference value of the horizontal azimuth angle is less than a third preset value, the determining module 103 can determine the adjustment to the orientation of the electronic device 1 needs to be ended. In at least one embodiment, the first preset value, the second preset value, and the third preset value can be the same.

At block 120, the controlling module 104 can control the camera device 14 to capture an image of the current scene.

In at least one embodiment, the display module 102 can further display an adjusting icon on the display device 13. The user can manually adjust setting parameters of the camera device 14 using the adjusting icon. For example, the display module 102 can display an adjusting icon for adjusting an exposure value of the camera device 14 on the second display area 132. The controlling module 104 can control the camera device 14 to capture the image of the current scene when the setting parameters of the electronic device 1 is adjusted.

FIG. 4 illustrates a flowchart of one embodiment of displaying images using the electronic device 1. The example method 500 is provided by way of example, as there are a variety of ways to carry out the method. The method 500 described below can be carried out using the configurations illustrated in FIG. 1, for example, and various elements of these figures are referenced in explaining example method 500. Each block shown in FIG. 4 represents one or more processes, methods or subroutines, carried out in the exemplary method 500. Additionally, the illustrated order of blocks is by example only and the order of the blocks can be changed according to the present disclosure.

The exemplary method 500 can begin at block 211. Depending on the embodiment, additional steps can be added, others removed, and the ordering of the steps can be changed.

At block 211, the obtaining module 101 can obtain the related parameters of each of the obtained images.

At block 212, the display module 102 can divide a horizontal direction of the first display area 131 into M value ranges, and divide a vertical direction of the first display area 131 into N value ranges, wherein the horizontal direction of the first display area 131 represents a first parameter of the related parameters of each of the obtained images, and the vertical direction of the first display area 131 represents a second parameter of the related parameters of each of the obtained images. Each of the M value ranges represents a range of the first parameter. Each of the N value ranges represents a range of the second parameter. In at least one embodiment, the M and N are positive integers.

In at least one embodiment, the first parameter is the horizontal azimuth angle of an image capturing device when the image capturing device captures the obtained image, and the second parameter is the color temperature of the obtained image. In other embodiments, the first parameter is the horizontal azimuth angle of the image capturing device when the image capturing device captures the obtained image, and the second parameter is the pitching angle of the image capturing device when the image capturing device captures the obtained image. In other embodiments, the first parameter and the second parameter can be replaced with other parameters.

Figure 7:
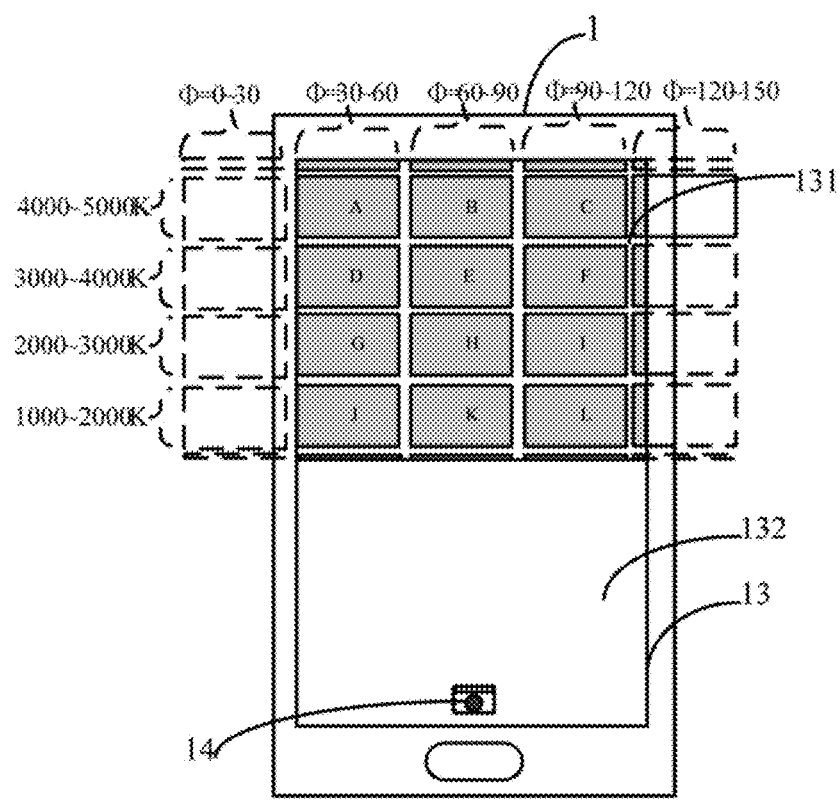
FIG. 7 illustrates an example of displaying images on the display device according to related parameters of the images.

For example, as shown in FIG. 7, the horizontal direction of the first display area 131 represents the horizontal azimuth angle of each of the obtained images. The display module 102 divides the horizontal direction of the first display area 131 into five value ranges, the five value ranges respectively represent the value ranges [0, 30 degrees), [30 degrees, 60 degrees), [60 degress, 90 degrees), [90 degrees, 120 degrees), and [120 degrees, 150 degrees]. The vertical direction of the first display area 131 represents the color temperature of each of the obtained images. The display module 102 divides the vertical direction of the first display area 131 into five value ranges including [0K, 1000K), [1000K, 2000K), [2000K, 3000K), [3000K, 4000K), and [4000K, 5000K].

At block 213, the display module 102 can display the obtained images on the first display area 131 according to a value range of the first parameter of each of the obtained images and a value range of the second parameter of each of the obtained images.

In at least one embodiment, the method can further include block 214.

At block 214, the obtaining module 101 can further obtain the first parameter of the electronic device 1. For example, the obtaining module 101 can obtain the horizontal azimuth angle of the electronic device 1 using the electronic compass 17 of the electronic device 1. The display module 102 can display the obtained images whose first parameters belong to the same value range as that of the first parameter of the electronic device 1 on a middle row of the first display area 131.

For example, as shown in FIG. 7, the obtaining module 101 obtains a current horizontal azimuth angle (e.g., 70 degrees) of the electronic device 1. That is, the current horizontal azimuth angle of the electronic device 1 belongs to the value rang [60 degrees, 90 degrees). Then the display module 102 displays the images "B", "E", "H", and "K" whose horizontal azimuth angles belong to the value rang [60 degrees, 90 degrees) on the middle position of the first display area 131.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for capturing an image using an electronic device, the electronic device comprising a camera device and a display device, the method comprising:

obtaining images directly from a predetermined device according to location coordinates of the electronic device, wherein location coordinates of each of the obtained images belongs to a predetermined geographical range, the predetermined geographical range is a circular range that is defined by a centre and a predetermined radius, and the location coordinates of the electronic device are set to be the centre, and the predetermined radius is equal to a predetermined distance from the centre;

dividing a display area of the display device into a first display area and a second display area;

dividing a horizontal direction of the first display area into M value ranges, wherein the horizontal direction of the first display area represents a first parameter of related parameters of each of the obtained images, and each of the M value ranges represents a range of the first parameter;

dividing a vertical direction of the first display area into N value ranges, wherein the vertical direction of the first display area represents a second parameter of the related parameters of each of the obtained images, and each of the N value ranges represents a range of the second parameter, wherein the M and N are positive integers; wherein the first parameter is a horizontal azimuth angle of an image capturing device when the image capturing device captures the obtained image, and the second parameter is selected from a color temperature of the obtained image and a pitching angle of the image capturing device when the image capturing device captures the obtained image;

displaying the obtained images on the first display area according to a value range of the first parameter of each of the obtained images and a value range of the second parameter of each of the obtained images;

displaying a preview image of a current scene on the second display area;

setting one of the obtained images to be a reference image;

calculating one or more difference values using current orientation parameters of the electronic device and orientation parameters of the reference image;

adjusting the orientation parameters of the electronic device according to the one or more difference values; and controlling the camera device to capture an image of the current scene based on the related parameters and/or orientation parameters of the reference image.

2. The method according to claim 1, wherein before controlling the camera device to capture the image, the method further comprises:
determining whether or not to adjust the orientation parameters of the electronic device;
obtaining the current orientation parameters of the electronic device when the orientation parameters of the electronic device are determined to require adjustment; and
wherein after adjusting the orientation parameters of the electronic device according to the one or more difference values, the method further comprises:
determining whether an adjustment to the orientation of the electronic device needs to be ended, the adjustment to the orientation of the electronic device is ending when each of the one or more difference value of the orientation parameters is less than a corresponding preset value, or a button displayed on the electronic device is touched.

3. The method according to claim 2, further comprising:
displaying one or more indicating icons to correspondingly indicate the one or more difference values on the display device;
wherein the one or more indicating icons comprise a first indicating icon, a second indicating icon, and a third indicating icon;
wherein the first indicating icon indicates that a distance value between the electronic device and a location where the reference image is captured;
wherein the second indicating icon indicates that a first difference value between a current pitching angle of the electronic device and a pitching angle corresponding to the reference image;
wherein the third indicating icon indicates that a second difference value between a current horizontal azimuth angle of the electronic device and a horizontal azimuth angle corresponding to the reference image;
wherein the second indicating icon includes a first indicating ball, when the first indicating ball is located at a middle position of the second indicating icon, the first difference value is equal to 0;
wherein the third indicating icon includes a second indicating ball, when the second indicating ball is located at a middle position of the third indicating icon, the second difference value is equal to 0.

4. The method according to claim 1, wherein the first parameter is different from the second parameter; wherein the first display area is located above the second display area, and sizes of the first display area and the second display area are each substantially equal to a size of half of the display area of the display device.

5. The method according to claim 1, further comprising:
obtaining the first parameter of the electronic device; and
displaying the obtained images whose first parameters belong to the same value range as that of the first parameter of the electronic device on a middle row of the first display area.

6. An electronic device, comprising:
a camera device;
a display device;
at least one processor; and
a storage device that stores one or more programs, when executed by the at least one processor, cause the at least one processor to:
obtain images directly from a predetermined device according to location coordinates of the electronic device, wherein location coordinates of each of the obtained images belongs to a predetermined geographical range, the predetermined geographical range is a circular range that is defined by a centre and a predetermined radius, and the location coordinates of the electronic device are set to be the centre, and the predetermined radius is equal to a predetermined distance from the centre;
divide a display area of the display device into a first display area and a second display area;
divide a horizontal direction of the first display area into M value ranges, wherein the horizontal direction of the first display area represents a first parameter of related parameters of each of the obtained images, and each of the M value ranges represents a range of the first parameter; wherein the first parameter is a horizontal azimuth angle of an image capturing device when the image capturing device captures the obtained image, and the second parameter is selected from a color temperature of the obtained image and a pitching angle of the image capturing device when the image capturing device captures the obtained image;
divide a vertical direction of the first display area into N value ranges, wherein the vertical direction of the first display area represents a second parameter of the related parameters of each of the obtained images, and each of the N value ranges represents a range of the second parameter, wherein the M and N are positive integers;
display the obtained images on the first display area according to a value range of the first parameter of each of the obtained images and a value range of the second parameter of each of the obtained images;
display a preview image of a current scene on the second display area;
set one of the obtained images to be a reference image;
calculate one or more difference values using current orientation parameters of the electronic device and orientation parameters of the reference image;
adjust the orientation parameters of the electronic device according to the one or more difference values; and
control the camera device to capture an image of the current scene based on the related parameters and/or orientation parameters of the reference image.

7. The electronic device according to claim 6, wherein before controlling the camera device to capture the image, the at least one processor further:
determining whether or not to adjust the orientation parameters of the electronic device;
obtaining the current orientation parameters of the electronic device when the orientation parameters of the electronic device are determined to require adjustment; and
wherein after adjusting the orientation parameters of the electronic device according to the one or more difference values, the at least one processor further:
determining whether an adjustment to the orientation of the electronic device needs to be ended, the adjustment to the orientation of the electronic device is ending when each of the one or more difference value of the orientation parameters is less than a corresponding preset value, or a button displayed on the electronic device is touched.

8. The electronic device according to claim 7, wherein the at least one processor further displays one or more indicating icons to correspondingly indicate the one or more difference values on the display device; wherein the one or more indicating icons comprise a first indicating icon, a second indicating icon, and a third indicating icon;
wherein the first indicating icon indicates that a distance value between the electronic device and a location where the reference image is captured;
wherein the second indicating icon indicates that a first difference value between a current pitching angle of the electronic device and a pitching angle corresponding to the reference image;
wherein the third indicating icon indicates that a second difference value between a current horizontal azimuth angle of the electronic device and a horizontal azimuth angle corresponding to the reference image;
wherein the second indicating icon includes a first indicating ball, when the first indicating ball is located at a middle position of the second indicating icon, the first difference value is equal to 0;
wherein the third indicating icon includes a second indicating ball, when the second indicating ball is located at a middle position of the third indicating icon, the second difference value is equal to 0.

9. The electronic device according to claim 6, wherein the first parameter is different from the second parameter;
wherein the first display area is located above the second display area, and sizes of the first display area and the second display area are each substantially equal to a size of half of the display area of the display device.

10. The electronic device according to claim 6, further comprising:
obtaining the first parameter of the electronic device; and
displaying the obtained images whose first parameters belong to the same value range as that of the first parameter of the electronic device on a middle row of the first display area.

11. A non-transitory storage medium having stored thereon instructions that, when executed by a processor of an electronic device, cause the processor to perform a method for capturing an image, the electronic device comprising a camera device and a display device, wherein the method comprises:
obtaining images directly from a predetermined device according to location coordinates of the electronic device, wherein location coordinates of each of the obtained images belongs to a predetermined geographical range, the predetermined geographical range is a circular range that is defined by a centre and a predetermined radius, and the location coordinates of the electronic device are set to be the centre, and the predetermined radius is equal to a predetermined distance from the centre;
dividing a display area of the display device into a first display area and a second display area;
dividing a horizontal direction of the first display area into M value ranges, wherein the horizontal direction of the first display area represents a first parameter of related parameters of each of the obtained images, and each of the M value ranges represents a range of the first parameter;
dividing a vertical direction of the first display area into N value ranges, wherein the vertical direction of the first display area represents a second parameter of the related parameters of each of the obtained images, and each of the N value ranges represents a range of the second parameter, wherein the M and N are positive integers; wherein the first parameter is a horizontal azimuth angle of an image capturing device when the image capturing device captures the obtained image, and the second parameter is selected from a color temperature of the obtained image and a pitching angle of the image capturing device when the image capturing device captures the obtained image;
displaying the obtained images on the first display area according to a value range of the first parameter of each of the obtained images and a value range of the second parameter of each of the obtained images;
displaying a preview image of a current scene on the second display area;
setting one of the obtained images to be a reference image;
calculating one or more difference values using current orientation parameters of the electronic device and orientation parameters of the reference image;
adjusting the orientation parameters of the electronic device according to the one or more difference values; and
controlling the camera device to capture an image of the current scene based on the related parameters and/or orientation parameters of the reference image.

12. The non-transitory storage medium according to claim 11, wherein before controlling the camera device to capture the image, the method further comprises:
determining whether or not to adjust the orientation parameters of the electronic device;
obtaining the current orientation parameters of the electronic device when the orientation parameters of the electronic device are determined to require adjustment; and
wherein after adjusting the orientation parameters of the electronic device according to the one or more difference values, the method further comprises:
determining whether an adjustment to the orientation of the electronic device needs to be ended, the adjustment to the orientation of the electronic device is ending when each of the one or more difference value of the orientation parameters is less than a corresponding preset value, or a button displayed on the electronic device is touched.

13. The non-transitory storage medium according to claim 12, wherein the method further comprises:
displaying one or more indicating icons to correspondingly indicate the one or more difference values on the display device;
wherein the one or more indicating icons comprise a first indicating icon, a second indicating icon, and a third indicating icon;
wherein the first indicating icon indicates that a distance value between the electronic device and a location where the reference image is captured;
wherein the second indicating icon indicates that a first difference value between a current pitching angle of the electronic device and a pitching angle corresponding to the reference image;
wherein the third indicating icon indicates that a second difference value between a current horizontal azimuth angle of the electronic device and a horizontal azimuth angle corresponding to the reference image;
wherein the second indicating icon includes a first indicating ball, when the first indicating ball is located at a middle position of the second indicating icon, the first difference value is equal to 0;
wherein the third indicating icon includes a second indicating ball, when the second indicating ball is located at a middle position of the third indicating icon, the second difference value is equal to 0.

14. The non-transitory storage medium according to claim 11, wherein the first parameter is different from the second parameter;
 wherein the first display area is located above the second display area, and sizes of the first display area and the second display area are each substantially equal to a size of half of the display area of the display device.

15. The non-transitory storage medium according to claim 11, further comprising:
 obtaining the first parameter of the electronic device; and
 displaying the obtained images whose first parameters belong to the same value range as that of the first parameter of the electronic device on a middle row of the first display area.

* * * * *